United States Patent
O'Gorman et al.

(10) Patent No.: US 6,952,795 B2
(45) Date of Patent: Oct. 4, 2005

(54) METHOD AND APPARATUS FOR VERIFYING THE INTEGRITY OF CONTROL MODULE OPERATION

(75) Inventors: Patrick A. O'Gorman, Grayslake, IL (US); Shawn Ferrell, Oxford, MI (US); Tim Grai, Oxford, MI (US)

(73) Assignee: Motorola, Inc., Schaumburg, IL (US)

( * ) Notice: Subject to any disclaimer, the term of this patent is extended or adjusted under 35 U.S.C. 154(b) by 624 days.

(21) Appl. No.: 10/000,609

(22) Filed: Oct. 24, 2001

(65) Prior Publication Data

US 2003/0061548 A1  Mar. 27, 2003

Related U.S. Application Data

(60) Provisional application No. 60/324,390, filed on Sep. 24, 2001.

(51) Int. Cl.[7] ............................................... G07F 11/00
(52) U.S. Cl. ........................................ 714/33; 714/37
(58) Field of Search .............................. 714/33, 37, 43, 714/47

(56) References Cited

U.S. PATENT DOCUMENTS 5,668,947 A  *  9/1997  Batcher ...................... 714/30
6,067,586 A  *  5/2000  Ziegler et al. ................ 710/18
6,647,513 B1 * 11/2003  Hekmatpour ................ 714/37

* cited by examiner

Primary Examiner—Nadeem Iqbal
Assistant Examiner—Timothy M. Bonura
(74) Attorney, Agent, or Firm—Brian M. Mancini; Steven A. May

(57) ABSTRACT

A control module (100) includes a first signal processing unit (102) that is coupled to a second signal processing unit (114) by a control bus (130), an address bus (131) and a data bus (132). The control module conveys seed value addresses (108) and expected result addresses (110) over the address bus, seed values (118) and verification set output values (107) over the data bus, and compares each verification set output value to an expected result (120), thereby allowing the control module to determine whether the first signal processing unit, the control bus, the address bus, and the data bus are collectively functioning correctly. By properly selecting the seed value addresses, expected result addresses, seed values, and expected results (and correspondingly, verification set output values), proper operation of each line of the address bus and control bus may be individually verified.

20 Claims, 6 Drawing Sheets

METHOD AND APPARATUS FOR VERIFYING THE INTEGRITY OF CONTROL MODULE OPERATION

This application claims benefit of provisional application No. 60/324,390 filed Sep. 24, 2001.

FIELD OF THE INVENTION

The present invention relates generally to automotive electronic systems, and, in particular, to a verification of correct operation of a processor and associated buses in an automotive electronic system.

BACKGROUND OF THE INVENTION

Many automotive systems in vehicles manufactured today are controlled by electronic control modules. These electronic control modules typically include one or more microprocessors that are linked by multiple buses and that control systems as wide ranging as a fuel injection systems, brake systems, and power-assist steering systems. The correct operation of these microprocessors and the control modules in which they reside are critical to the safe operation of the vehicle.

For example, with respect to power-assist steering, a turn of a steering wheel causes electronic signals which represent torque and steering wheel position to be sent to a control module. Based on these conveyed signals and a vehicle speed sent by another module, the steering-assist module generates control signals that cause assistance to be provided to an operator of the vehicle in the turning of the vehicle's wheels. A malfunctioning of the control module could have disastrous consequences. For example, a vehicle operator may be making a left-hand turn while a malfunctioning control module provides right-hand turn assistance. In such a situation, it is preferable to disable the power-assist steering system altogether and allow the vehicle operator to manually steer the vehicle.

One method of verifying the integrity of microprocessor operation is through redundant systems. A control module contains two microprocessors, a primary microprocessor and an auxiliary microprocessor. The primary microprocessor executes a main control algorithm and the auxiliary microprocessor executes some form of the main control algorithm (either a duplicate of the algorithm or a simplified version of the algorithm). The results of each computation are then compared to ensure that they both agree or are within a certain margin of error.

The use of the dual microprocessor scheme is expensive, especially when the auxiliary microprocessor is performing functions redundant of functions performed by the primary microprocessor. Furthermore, the execution of the same program by primary and auxiliary microprocessors and the comparison of the results within a range of error does not test the buses associated with the primary microprocessor, which can also be a source of system error. In addition, in the dual microprocessor scheme, when software changes are made to the primary microprocessor the changes will also need to be implemented in the auxiliary microprocessor.

Therefore, a need exists for a method and an apparatus for verifying the integrity of control module operation, in particular the integrity of the operation of a microprocessor bus lines associated with the microprocessor, and that does not require the execution of redundant algorithms.

DETAILED DESCRIPTION OF THE INVENTION

Figure 1:
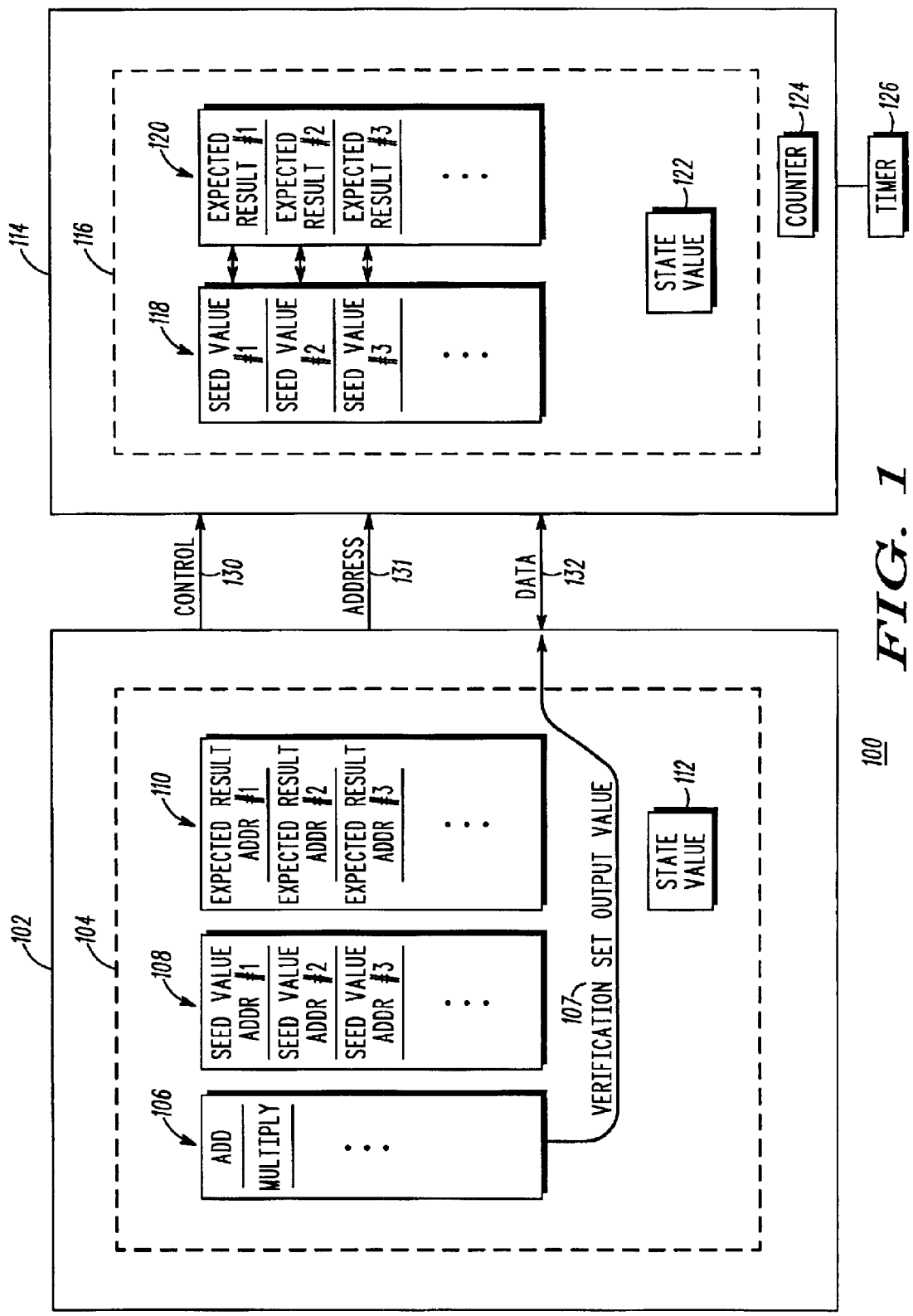
FIG. 1 is a block diagram of an automotive control module in accordance with an embodiment of the present invention.

To address the need for a method and an apparatus for verifying the integrity of control module operation, in particular the integrity of the operation of a microprocessor bus lines associated with the microprocessor, and that does not require the use of dual microprocessors or the execution of redundant algorithms, a control module includes a first signal processing unit that is coupled to a second signal processing unit by a control bus, an address bus, and a data bus. The control module conveys seed value addresses and expected result addresses (over the address bus, seed values and verification set output values over the data bus, and compares each verification set output value to an expected result, thereby allowing the control module to determine whether the first signal processing unit, the control bus, the address bus, and the data bus are collectively functioning correctly. By properly selecting the seed value addresses, expected result addresses, seed values, and expected results (and correspondingly, verification set output values), proper operation of each line of the address bus and control bus may be individually verified.

Generally, one embodiment of the present invention encompasses a method for or verifying the integrity of operation of a control module having a digital signal processing unit. The method includes steps of conveying a seed value to the digital signal processing unit, executing, by the digital signal processing unit, a set of verification instructions based on the seed value to produce a verification set output value. The method further includes steps of receiving, from the digital signal processing unit, the verification set output value, comparing the verification set output value to an expected result to produce a comparison, and determining whether an error has occurred based on the comparison.

Another embodiment of the present invention encompasses a method for verifying the integrity of operation of a control module having a first digital signal processing unit coupled to second digital signal processing unit, wherein the first digital signal processing unit stores a set of verification instructions, wherein the second digital signal processing unit stores a plurality of seed values and a plurality of expected results. The method includes steps of (a) conveying, by the second digital signal processing unit to the first digital signal processing unit, a seed value of the plurality of seed values, (b) executing, by the first digital signal processing unit, the set of verification instructions based on the seed value to produce a verification set output value, and (c) conveying, by the first digital signal processing unit to the second digital signal processing unit, the verification set output value. The method further includes steps of (d) comparing, by the second digital signal processing unit, the verification set output value to a corresponding expected result of the plurality of expected results to produce a comparison, (e) determining whether an error has occurred based on the comparison, and (f) determining whether a predetermined number of iterations of steps (b) through (e) have been completed. When fewer than the predetermined number of iterations have been completed, conveying a succeeding seed value of the plurality of seed values to the first digital signal processing unit and repeating steps (b) through (f).

Still another embodiment of the present invention encompasses a control module that self-verifies the integrity of the module's operations. The control module includes a first digital signal processing unit coupled to a second signal processing unit. The first digital signal processing unit receives a seed value from the second digital signal processing unit, executes a set of verification instructions based on the seed value to produce a verification set output value, and conveys the verification set output value to the second digital signal processing unit. The second digital signal processing unit stores the seed value and an expected result, conveys the seed value to the first digital signal processing unit, receives the verification set output value from the first digital signal processing unit, compares the received verification set output value to the expected result to produce a comparison, and determines whether an error has occurred based on the comparison.

The present invention may be more fully described with reference to FIGS. 1–4. FIG. 1 is a block diagram of an automotive control module 100 in accordance with an embodiment of the present invention. Automotive control module 100 includes a first digital signal processing unit 102, preferably a processor such as a microprocessor, a digital signal processor (DSP), or a microcontroller. Automotive control module 100 further includes a second digital signal processing unit 114, preferably an Application Specific Integrated Circuit (ASIC) or alternatively any other type of digital signal processing unit such as a microprocessor or a DSP, coupled to processor 102 by multiple buses 130–132. The multiple buses preferably include a control bus 130, an address bus 131, and a data bus 132. In another embodiment of the present invention, the functions of buses 130–132 may be performed by a serial bus wherein one or more lines comprise a serial communication link between processor 102 and ASIC 114.

Each of processor 102 and ASIC 114 respectively includes an associated memory 104, 116 that stores data and further stores instructions and programs that are executed by the processor and ASIC. In other embodiments of the present invention, one or more of memories 104 and 116 may be external to, or partially included in and partially external to, processor 102 and ASIC 114, respectively.

Memory 104 of processor 102 stores a set of verification instructions 106, such as ADD, MULTIPLY, SHIFT, and MEMORY ACCESS. The set of verification instructions 106 is executed in a predetermined sequence by processor 102 in order to verify a correct operation of the processor. Before processor 102 executes the set of verification instructions 106, the processor first reads a seed value 118 from ASIC 114. The seed value read by the processor is then input into the set of verification instructions 106 as a starting value. Processor 102 executes the set of verification instructions 106 in a serial fashion and produces a verification set output value 107. Processor 102 then conveys the verification set output value 107 back to ASIC 114 for comparison to a predetermined verification set output value 120 expected by the ASIC. The set of verification instructions 106 may comprise a set of instructions especially designed for the verification testing executed by control module 100 or may comprise any predetermined group of instructions that are stored in memory 104 and then executed by processor 102 as part of a verification procedure.

Memory 104 further stores multiple seed value addresses, multiple expected result addresses 110, and a state value 112 that corresponds to a state of the verification process described below. Each seed value address 108 of the multiple seed value addresses corresponds to a seed value 118 stored in ASIC 114, and each expected result address of the multiple expected result addresses 110 corresponds to an expected result 120 stored in the ASIC. When processor 102 conveys the verification set output value 107 to ASIC 114, the ASIC compares the verification set output value 107 to an expected verification set output value 120, that is, an expected result, stored in the ASIC. ASIC 114 locates the appropriate expected result 120 based on the seed value that was read by processor 102. For example, when processor 102 reads seed value #1 for input into the set of verification instructions 106, then ASIC 114 compares a subsequently received verification set output value to expected result #1. Each expected result address 110 stored in processor 102 corresponds to an expected result 120 stored in the ASIC 114.

Memory 116 of ASIC 114 stores multiple seed values 118. Each seed value of the multiple seed values 118 functions as an input value for the execution, by processor 102, of the set of verification instructions 106 stored in the processor. Memory 116 further stores multiple expected verification set output values 120, that is, expected results, that ASIC 114 expects to receive in response to the conveyance of each of the multiple seed values 118 to processor 102. Memory 116 further stores a state value 122 corresponding to a state of the verification process described below.

Preferably address bus 131 is an 8-bit address bus, and correspondingly each seed value address 108 and expected result address 110 stored in processor 102 is an 8-bit vector ranging in value from 0 to 255 (i.e., from $2^0-1$ to $2^8-1$). Furthermore, data bus 132 preferably is a 16-bit data bus, and correspondingly each seed value 118 and expected result 120 stored in ASIC 114 and each verification set output value 107 produced by processor 102 is a 16-bit vector. However, those who are of ordinary skill in the art realize that address bus 131 may be any size other than an 8-bit bus, with the result that the seed value addresses 108 and the expected result addresses 110 stored in processor 102 may also be of a size other than 8-bits. Furthermore, those who are of ordinary skill in the art realize that data bus 132 may be any size other than a 16-bit data bus, with the result that the seed values, verification set output values, and expected results may be of a size other than 16 bits, without departing from the spirit and scope of the present invention. In another embodiment of the present invention, when processor 102 is coupled to ASIC 114 by a serial bus, then the addresses 108 and 110, seed values 118, verification set output values 107, and expected results 120 are of a size appropriate for the size of the serial bus so that all lines coupling the processor to the ASIC may be tested.

Figure 2:
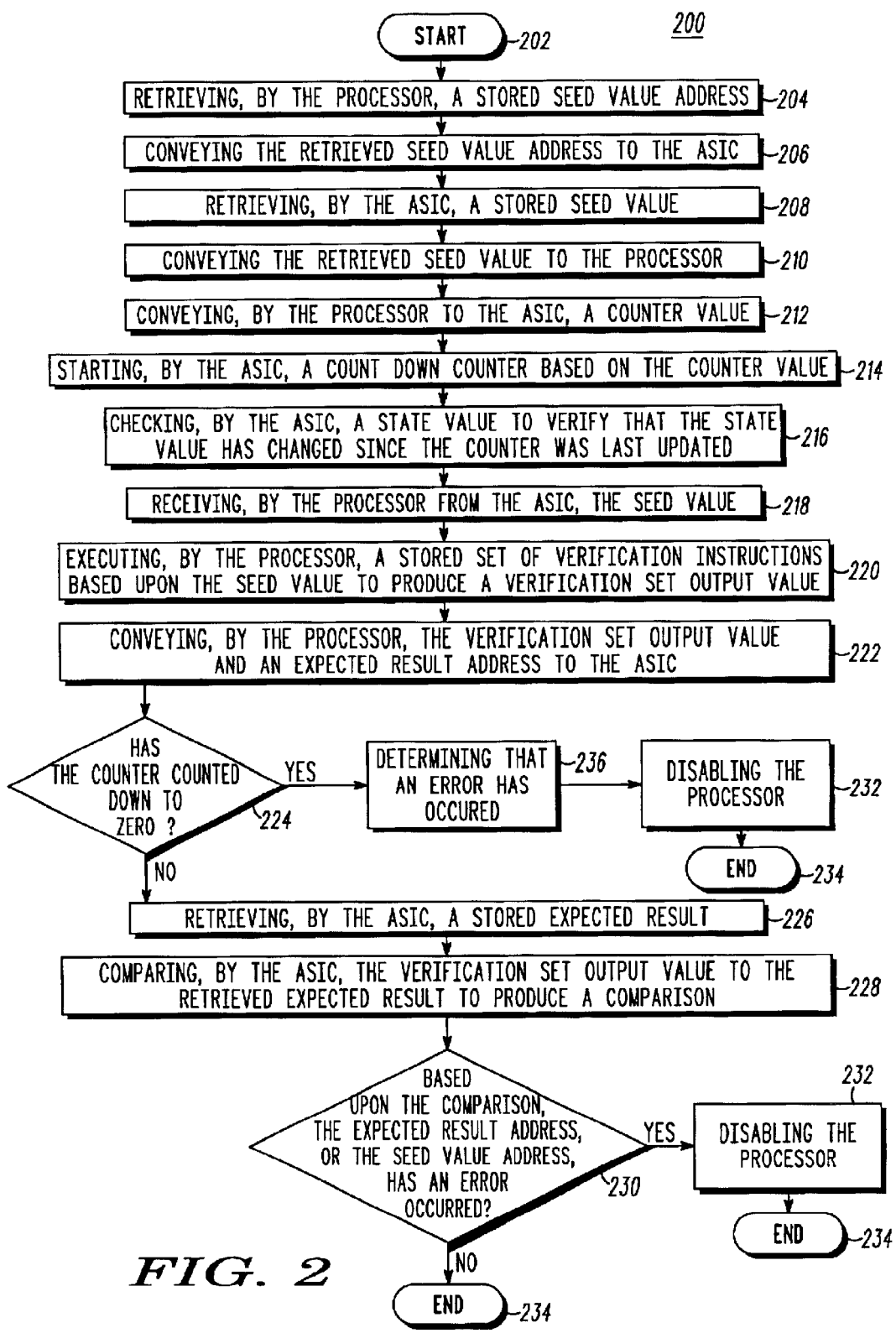
FIG. 2 is a logic flow diagram of steps executed by an automotive control module to perform an operational check of the automotive control module in accordance with an embodiment of the present invention.

FIG. 2 is a logic flow diagram 200 of the steps executed by control module 100 to perform an operational check of processor 102, control bus 130, address bus 131, and data bus 132 in accordance with an embodiment of the present invention. The logic flow begins (202) when processor 102 executes a READ function. In the execution of the READ function, processor 102 retrieves (204) a seed value address 108 from memory 104 and conveys (206) the address to ASIC 114. Upon receiving the seed value address, ASIC 114 retrieves (208), from memory 116, a seed value 118 based on the seed value address 108 received from processor 102 and conveys (210) the retrieved seed value 118 back to processor 102. In another embodiment of the present invention, ASIC 114 may retrieve the seed value 118 based on the state value 122 stored in memory 116 of ASIC 114. Processor 102 also conveys (212) a counter value to a counter 124 included in ASIC 114. ASIC 114 starts (214) counter 124 and counter 124 begins counting down from the received counter value to zero with reference to a timer 126 included in, or coupled to, the ASIC. By counting down from the received counter value to zero, counter 124 in effect counts down a time period corresponding to the received counter value. The counter value and associated time period are based on a known period of time which is somewhat in excess of the time consumed by processor 102 in receiving the seed value from ASIC 114, processing the set of verification instructions stored in register 106 to produce a verification set output value 107, and returning the verification set output value to ASIC 114. Preferably, the counter value and associated time period are further based on an amount of time required to perform controller-related functions, such as an amount of time required to do the main steering-assist calculations. The counter value preferably is such that when the verification process fails to detect an error, the counter will not attain a zero value prior to the completion of a single iteration of steps (214)–(230). When the ASIC receives the counter value, the ASIC also checks (216) state value 122 to verify that the stored state value has changed since the last time the counter was updated.

Upon receiving (218) the seed value 118, processor 102 executes (220) the set of verification instructions 106 stored in memory 104 to produce a verification set output value 107. The seed value 118 received from ASIC 114 serves as initial input data for a serial execution of the set of verification instructions 106. For example, a first instruction of the set of verification instructions 106 is executed by processor 102, using the seed value 118 as input data, to produce a first output value. The first output value then serves as input data with respect to an execution of a second instruction of the set of verification instructions 106 to produce a second output value. The second output value then serves as input data with respect to an execution of a third instruction of the verification instructions 106 to produce a third output value, and so on, until all of the verification instructions are executed by processor 102 to produce the verification set output value 107.

Processor 102 conveys (222) the verification set output value 107 to ASIC 114 via data bus 132. Processor 102 also retrieves an expected result address 110 from memory 104 and conveys (222) the retrieved expected result address to the ASIC via address bus 131. If counter 124 counts down to zero (224) prior to ASIC 114 receiving one or more of the expected result address 110 and the verification set output value 107, ASIC 114 determines (236) that an error has occurred and processor 102 is disabled (232). Counter 124 counting down to zero corresponds to an expiration of the time period corresponding to the counter value; by writing a new value into counter 124 periodically, it is expected that in normal operation of the verification process the value of zero will never be reached in the absence of an error in the process. This is known to those skilled in the art as a 'watchdog timer'. In another embodiment of the present invention, when counter 124 counts down to zero prior to ASIC 114 receiving one or more of the expected result address 110 and the verification set output value 107, steps (204)–(222), or alternatively a subset of steps (204)–(222), such as steps (210)–(222), may be repeated. Steps (204)–(222) may then be repeated multiple times until one or more of the expected result address 110 and verification set output value 107 are received by ASIC 114 prior to counter 124 counting down to zero or until the process is repeated a predetermined number of times, whichever shall first occur. If the process is repeated a predetermined number of times without successfully conveying the verification set output value 107 prior to counter 124 counting down to zero, then ASIC 114 determines (236) that an error has occurred, processor 102 is disabled (232), and the logic flow ends (234).

For each seed value 118 there is a unique corresponding expected result 120. When either the verification set output value 107, or the expected result address 110, or both are received prior to the expiration of the time period counted down by counter 124, ASIC 114 retrieves (226) an expected result based upon the state value 122 stored in memory 116 and compares (228) the received verification set output value 107 to the retrieved expected result 120 to produce a comparison. In another embodiment of the present invention, ASIC 114 may retrieve the expected result based upon the received expected result address 110. ASIC 114 then determines (230) whether an error has occurred based on the comparison or based on receiving an erroneous seed value address 108 or expected result address 110. An error is indicated when the received verification set output value 107 does not match the retrieved expected result. When ASIC 114 determines that an error has occurred, processor 102 is disabled (232) and the logic flow then ends (234).

By conveying a seed value address 108 and an expected result address 110 over address bus 131, conveying a seed value 118 and a verification set output value 107 over data bus 132, and comparing the verification set output value 107 to an expected result 120, control module 100 is able to determine whether processor 102, control bus 130, address bus 131, and data bus 132 are collectively functioning correctly.

In another embodiment of the present invention, a "multiple iteration" embodiment, the process of producing a verification set output value 107 based on a seed value 118 and comparing the verification set output value to an expected result 120 is repeated multiple times. As is described in greater detail below, for each iteration, processor 102 conveys a new seed value address 108 to ASIC 114. In response to receiving the seed value address, ASIC 114 returns to processor 102 a corresponding seed value 118. Processor 102 then executes the set of verification instructions 106 based on the received seed value 118 to produce a verification set output value 107. Processor 102 conveys the verification set output value 107 to ASIC 114 along with a corresponding expected result address 110. ASIC 114 retrieves an expected result 120 from the memory 116 and compares the retrieved expected result 120 to the received verification set output value 107.

Each of processor 102 and ASIC 114 keeps track of which iteration of the multiple iterations is being executed by control module 100 by reference to a respective state value 112, 122 stored in a respective memory 104, 116. By processor 102 tracking the iterations, the processor can determine which seed value address 108 to convey to ASIC 114. By ASIC 114 tracking the iterations, the ASIC can determine which expected result 120 to retrieve from memory 116. Each iteration involves a different seed value address 108, and correspondingly a different seed value 118, a different verification set output value 107, a different expected result address 110, and a different expected result 120. By properly selecting the values corresponding to each seed value address 108, seed value 118, and expected result address 110, control module 100 can verify the performance of individual lines in each of control bus 130, address bus 131, and data bus 132.

Optimally, the number of iterations performed by the multiple iteration embodiment corresponds to a size of address bus 131, that is, when address bus 131 is an 8-bit bus then the above described process is executed eight (8) times. Preferably, the seed value addresses 108 for successive iterations of the multiple iterations are 0000 0001, 0000 0010, 0000 0100, 0000 1000, 0001 0000, 0010 0000, 0100 0000, 1000 0000. The expected value addresses 110 for the successive iterations are then the 1's complement of the seed value address used in each respective iteration, that is, 1111 1110, 1111 1101, 1111 1011, 1111 0111, 1110 1111, 1101 1111, 1011 1111, and 0111 1111. By walking a '1' across address bus 131 with respect to the seed value addresses 108, and walking a '0' across address bus 131 with respect to the expected value addresses 110, each address line of an 8-bit address bus may be checked for errors and to determine if the line is tied HIGH ('1') or LOW ('0'). Similarly, by properly distributing 1's and 0's in the seed values 118 and the verification set output values, each data line of a 16-bit data bus 132 may be checked for errors and to determine if the line is tied HIGH ('1') or LOW ('0'). Preferably, for a 16-bit data line, each seed value 108 includes at least seven 1's and at least seven 0's. Furthermore, each bit of the seed values 108 preferably changes at least every third seed value, thereby optimizing a rapid determination of stuck data bits.

Those who are of ordinary skill in the art realize that the number of iterations is up to the control module software designer and that other numbers of iterations may be used herein without departing from the spirit and scope of the present invention. For example, the number of iterations performed may correspond to a size of data bus 132, that is, when data bus 132 is a 16-bit bus then the above described process may be reiterated 16 times.

Figure 3A:
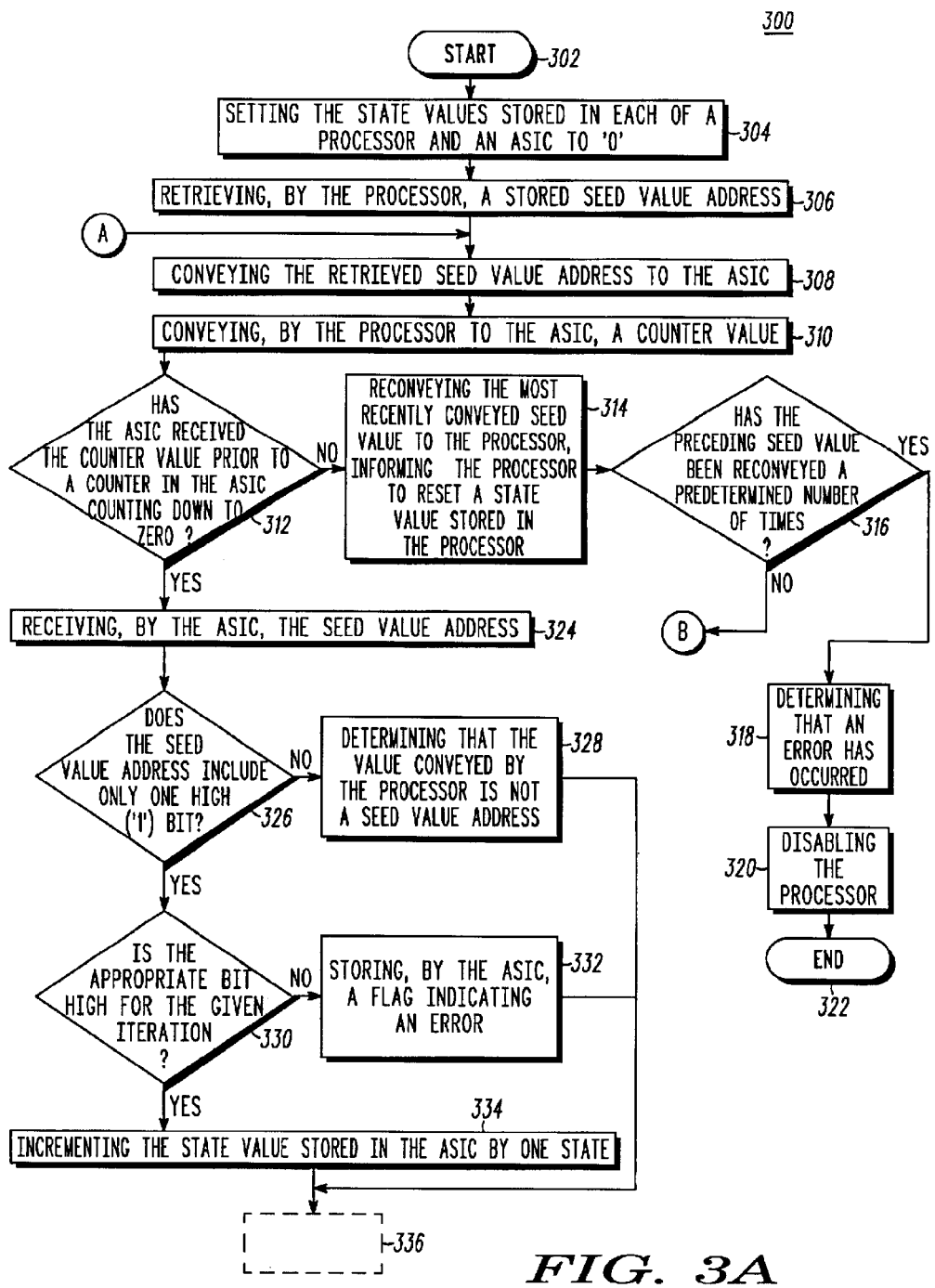
FIG. 3a is a logic flow diagram of the steps executed by an automotive control module to perform an operational check of the automotive control module in accordance with another embodiment of the present invention.
Figure 3B:
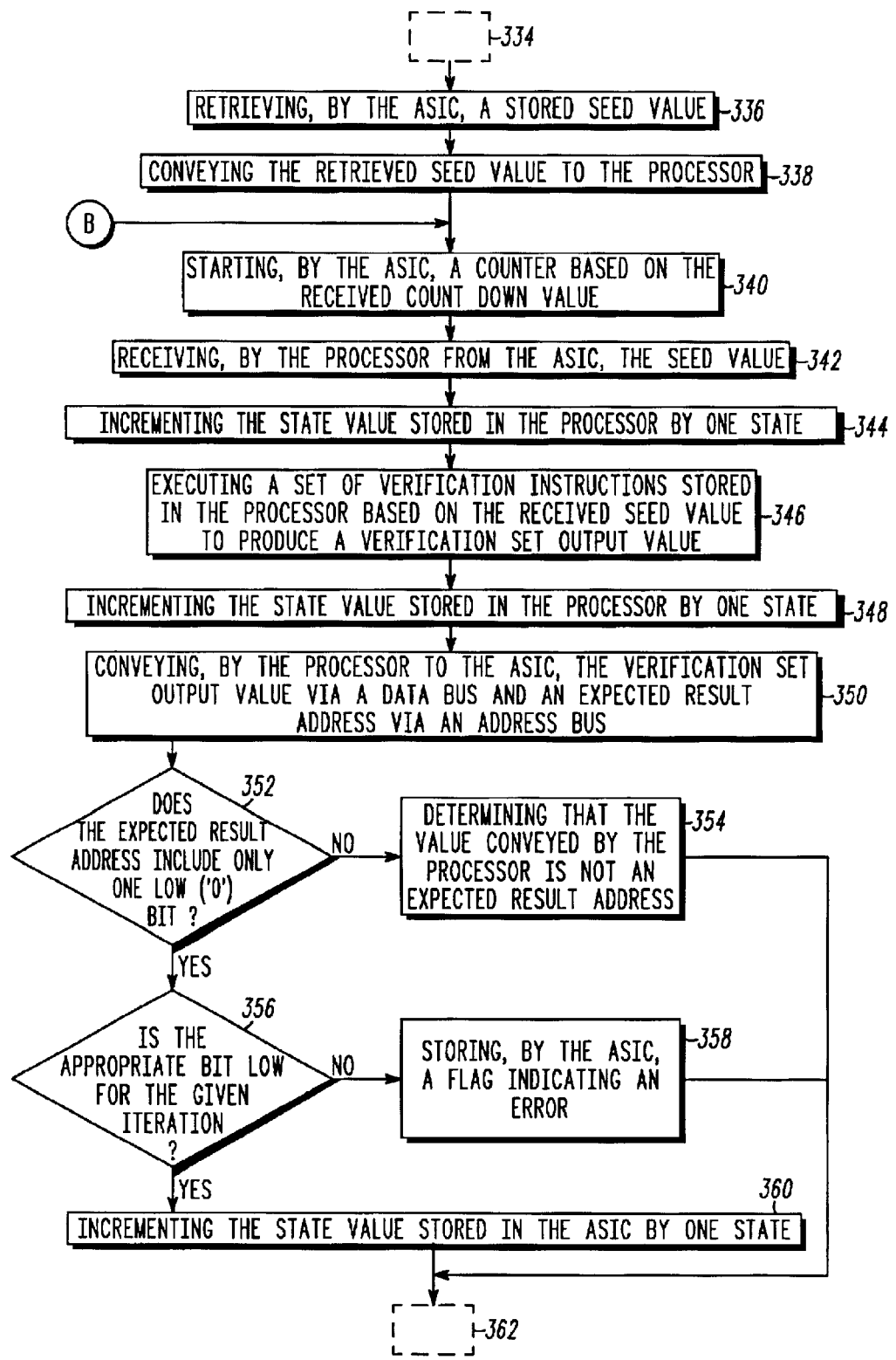
FIG. 3b is a continuation of the logic flow diagram of FIG. 3a of the steps executed by an automotive control module to perform an operational check of the automotive control module in accordance with another embodiment of the present invention.
Figure 3C:
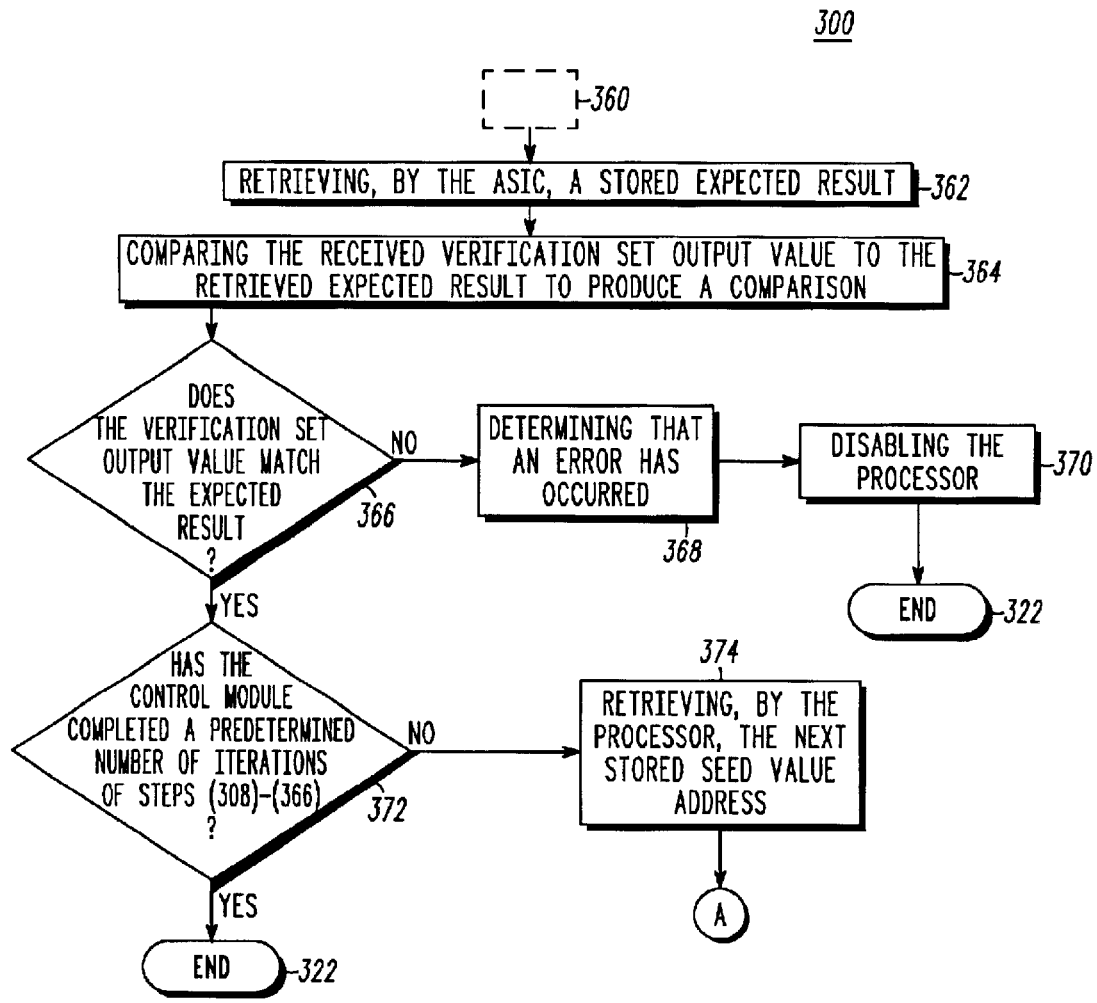
FIG. 3c is a continuation of the logic flow diagram of FIGS. 3a and 3b of the steps executed by an automotive control module to perform an operational check of the automotive control module in accordance with another embodiment of the present invention.

With reference to FIGS. 3a, 3b, and 3c, a logic flow diagram 300 is provided that depicts the steps executed by control module 100 to perform an operational check of processor 102, control bus 130, address bus 131, and data bus 132 in accordance with the "multiple iteration" embodiment of the present invention. The logic flow begins (302) with a setting (304) of the state values stored in each of registers 112 and 122 to state '0.' Processor 102 then executes a READ function, retrieving (306) a stored seed value address 108 (e.g., seed value address #1 in the first iteration) and conveys (308) the address to ASIC 114. Processor 102 also conveys (310) a counter value to ASIC 114, which counter value serves as a starting point for counter 124 in ASIC 114 to count down to zero.

In iterations subsequent to the first iteration, when ASIC 114 receives a counter value in step 310, counter 124 will be in the process of counting down to zero, or will have completed counting down to zero, with reference to a counter value received during the preceding iteration. When counter 124 counts down to zero (312) prior to ASIC 114 receiving a new counter value, ASIC 114 instructs (314) processor 102 to reset the state value 112 stored in memory 104 to the state value 122 stored in memory 116 of ASIC 114. ASIC 114 also reconveys (314) to processor 102 a seed value that was most recently conveyed to the processor and determines (316) whether the most recently conveyed seed value has been reconveyed to the processor a predetermined number of times. When the reconveyed seed value has been reconveyed to the processor the predetermined number of times, then ASIC 114 determines (318) that an error has occurred and disables (320) processor 102. The logic flow then ends (322). When the reconveyed seed value has been reconveyed to the processor fewer than the predetermined number of times, then control module 100 proceeds to step 340, as described in greater detail below, processing the seed value as the control module would process a newly retrieved seed value.

Upon receiving (312) a counter value for a first iteration, or, in subsequent iterations, upon receiving a counter value prior to counting down to zero based on the previously received counter value, and further upon receiving (324) the seed value address 108, ASIC 114 determines (326) whether the seed value address includes only one HIGH ('1') bit. When the received seed value address includes other than one HIGH bit, ASIC 114 determines (328) that the value conveyed by processor 102 is not a seed value address and proceeds to step 336. When the seed value address contains only one HIGH bit, then ASIC 114 determines (330) if the appropriate bit is HIGH with reference to the state value stored in register 122 (e.g., for the first iteration, seed value address 108 may be 0000 0001). When the appropriate bit is HIGH for the given iteration, ASIC 114 then increments (334) the state value stored in register 122 by one state, that is, to state '1.' When the wrong bit is HIGH for the given iteration, ASIC 114 stores (332) a flag in memory 116 indicating an error and proceeds to step 336.

ASIC 114 then retrieves (336) a seed value 118 (e.g., seed value #1 in the first iteration) based on the received seed value address 108 and conveys (338) the retrieved seed value to processor 102 via data bus 132. In another embodiment of the present invention, ASIC 114 may retrieve the seed value 118 based on the state value 122 stored in memory 116.

When processor 102 receives (342) the seed value 108 from ASIC 114, the processor increments (344) the state value 112 stored in memory 104 by one state (i.e., to state '1' in the first iteration). Processor 102 executes (346) the verification instructions 106 stored in memory 104 based on the received seed value 108 to produce a verification set output value 107 (i.e., a first verification set output value in reference to the first iteration). Processor 102 then further increments (348) state indicator 112 by one state (i.e., to state '2') and conveys (350) the verification set output value 107 to ASIC 114 via data bus 132. Processor 102 also conveys (350) an expected result address 110 (i.e., expected result address #1 in the first iteration) to ASIC 114 via address bus 131, which expected result address corresponds to an expected result 120 (i.e., expected result #1 in the first iteration) stored in memory 116 of ASIC 114.

Upon receiving the expected result address 110 and the verification set output value 107 from processor 102, ASIC 114 determines (352) whether the received expected result address 110 contains only one LOW ('0') bit. When the expected result address 110 contains more than one LOW bit, ASIC 114 determines (354) that the value conveyed by processor 102 is not an expected result address and proceeds to step 362. When the expected result address 110 contains only one LOW bit, then ASIC 114 determines (356) if the appropriate bit is LOW with reference to the state value stored in register 122 (i.e., for the first iteration, the secondary expected result address is 1111 1110). When the appropriate bit is LOW for the given iteration, ASIC 114 then increments (360) the state value stored in register 122 by one state, that is, to state '2.' When the wrong bit is LOW for the given iteration, ASIC 114 stores (358) one or more flags in memory 116 indicating an error and proceeds to step 362.

In addition, upon receiving the expected result address 110 and the verification set output value 107 from processor 102, ASIC 114 retrieves (362) an expected result 120 (e.g., expected result #1 in the first iteration) from memory 116 based upon the received expected result address 110. In another embodiment of the present invention, ASIC 114 retrieves expected result 120 based upon state value 122, which state value indicates the state of verification process 300 and thereby the appropriate expected result. ASIC 114 compares (364) the received verification set output value 107 to the retrieved expected result 120 to produce a comparison. When the verification set output value 107 does not match (366) the expected result 120, ASIC 114 determines that an error has occurred and disables processor 102 (370). The logic flow then ends (322). When the verification set output value 107 matches (366) the expected result 120, ASIC 114 determines (372) whether control module 100 has completed a predetermined number of iterations of steps (308)–(366). Preferably ASIC 114 determines the number of iterations completed by comparing state value 122 stored in memory 116 to a final state value stored in memory 116. However, those who are of ordinary skill in the art realize that there are a variety of methods by which ASIC 114 may determine the number of iterations of verification process 300 without departing from the spirit and scope of the present invention. For example, a counter stored in memory 116 may be incremented or decremented each time an iteration is completed, or control module 100 may determine whether any seed values 118 remain to be conveyed by ASIC 114 to processor 102, or control module 100 may determine whether any seed value addresses 108 or expected value addresses 110 remain to be conveyed by processor 102 to ASIC 114.

When the stored state value 122 is equal to the final state value, ASIC 114 determines that control module 100 has completed the predetermined number of iterations and the logic flow ends (322). When state value 122 is less than the final state value, processor 102 retrieves (374) a next seed value address from the multiple seed value addresses 108 stored in memory 104, such as a seed value address #2 after having just completed an iteration involving seed value address #1, and steps (308)–(372) are repeated.

For example, and merely for the purpose of illustrating the principles of the present invention and not intended to limit the invention in any way, in repeating steps (308)–(372), processor 102 retrieves a next seed value address 108 (i.e., seed value address #2) and conveys the retrieved seed value address to ASIC 114. Upon receiving the seed value address 108 (i.e., seed value address #2), and assuming that no errors are detected in the second seed value address received by ASIC 114, the ASIC retrieves a next seed value 118 (i.e., seed value #2) corresponding to the received seed value address (i.e., seed value address #2). ASIC 114 also increments the state value 122 stored in memory 116 one state, that is, to state '3.' ASIC 114 then conveys the retrieved seed value 118 (i.e., seed value #2) to processor 102. Processor 102 also conveys a new counter value to ASIC 114 and the ASIC and starts counter 124 counting down with reference to the newly received counter value.

Upon receiving the seed value 118 (i.e., seed value #2), processor 102 increments state value 112 stored in memory 104 one state, that is, to state '3.' Processor 102 executes the set of verification instructions 106 based on the received seed value (i.e., seed value #2) to produce a new verification set output value 107 and further increments state value 112 one more state, that is, to state '4.' Processor 102 also retrieves a next expected result address (i.e., expected result address #2) based on the state value 112 stored in memory 104. Processor 102 then conveys the retrieved expected result address (i.e., expected result address #2) to ASIC 114 via address bus 131, and also conveys to ASIC 114 the new verification set output value 107 via data bus 132.

Upon receiving the expected result address 110 (i.e., expected result address #2) and the new second verification set output value, and assuming that the time period counted down by counter 124 has not expired and that no errors are detected by ASIC 114 in the received expected result address 110, ASIC 114 retrieves an expected result 120 (i.e., expected result #2) based on the state value 122 stored in memory 116, or alternatively based on the received expected result address. ASIC 114 then compares the received verification set output value 107 to the retrieved expected result (i.e., expected result #2). ASIC 114 also increments the state value 122 stored in memory 116 one more state, that is, to state '4.' ASIC 114 then determines whether an error has occurred based on the comparison. An error is indicated when the received verification set output value does not match the received expected result (i.e., expected result #2).

In one embodiment of the present invention, when ASIC 114 determines at any step, such as at steps (326), (332), (352), (356) and (366), that an error has occurred, ASIC 114 disables processor 102, or alternatively control module 100, and the logic flow ends. In another embodiment of the present invention, when ASIC 114 determines that an error has occurred, such as in steps (326), (332), (352), (356) and (366), the ASIC stores information concerning the error and further stores information concerning the iteration during which the error occurred (for example, flagging the state value 122 stored at that moment) and control module 100 continues onto the next iteration. In the latter embodiment, when ASIC 114 completes the multiple iterations, the ASIC checks memory 116 to determine whether any error occurred. When the check of memory indicates that that an error did occur during one or more of the multiple iterations, ASIC 114 disables processor 102, or alternatively control module 100, and the logic flow ends (322). In yet another embodiment of the present invention, control module 100 continues onto a next iteration only when a determined error is due to something other than counter 124 counting down to zero.

Figure 4:
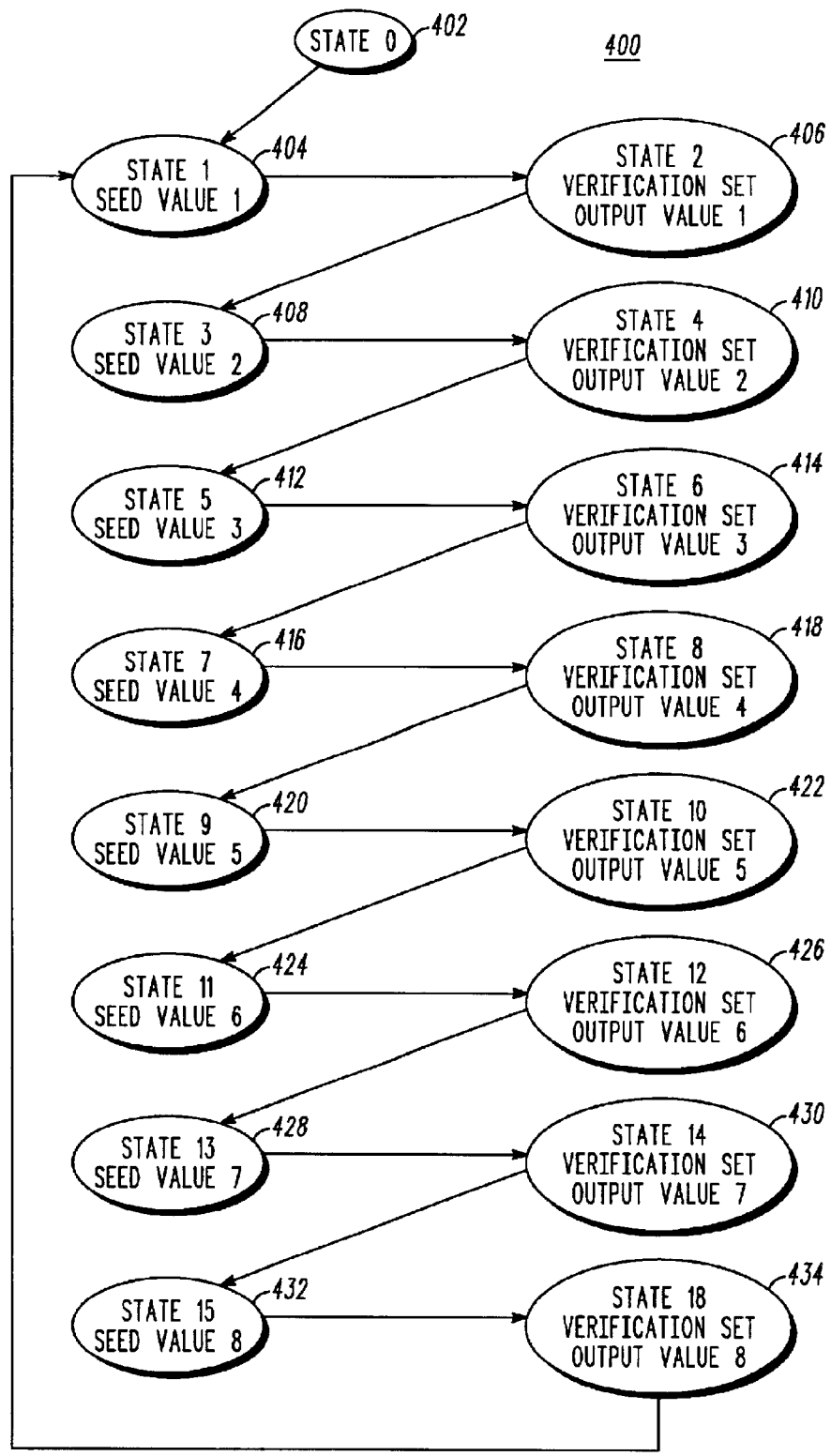
FIG. 4 is a state diagram 400 of the states of an automotive control module that is performing an operational check in accordance with another embodiment of the present invention.

FIG. 4 is a state diagram 400 depicting the states of each of processor 102 and ASIC 114 during an exchange of seed values and verification set output values in accordance with the process described in logic flow diagram 300. The states depicted in state diagram 400 assume that eight (8) different seed values are provided by ASIC 114 to processor 102 during the process, and in response processor 102 returns to ASIC 114 eight (8) different verification set output values and a corresponding eight (8) different addresses and eight (8) different state indicators. State diagram 400 is presented for the purpose of assisting the reader in understanding the principles of the present invention and is not intended to limit the invention in any way.

When the process depicted in logic flow diagram 300 begins, the state values stored in each of registers 112 and 122 are set to '0' (402). When ASIC 114 correctly receives a first seed value address (i.e., corresponding to a first seed value, that is, seed value 1) from processor 102, the ASIC sets (404) the state value stored in register 112 to '1.' When processor 102 receives the first seed value, the processor sets (404) the state value stored in register 122 to '1' as well. When processor 102 subsequently conveys a first verification set output value (i.e., verification set output value 1), a first secondary expected value address, and a state value to ASIC 114, the processor sets (406) the state value stored in register 122 to '2.' When ASIC 114 correctly receives the first secondary expected value address, the ASIC sets (406) the state value stored in register 122 to '2' as well.

As depicted in state diagram 400, when ASIC 114 correctly receives each of a second, third, fourth, fifth, sixth, seventh, and eighth seed value address, ASIC 114 respectively sets the state value stored in register 122 to a '3,' (408) '5,' (412) '7,' (416) '9,' (420) '11,' (424) '13,' (428) and '15' (432). And when ASIC 114 correctly receives each of a first, second, third, fourth, fifth, sixth, seventh and eighth secondary expected value address, ASIC 114 respectively sets the state value stored in register 122 to a '4,' (410) '6,' (414) '8,' (418) '10,' (422) '12,' (426) '14,' (430) and '16' (434). Similarly, when processor 102 receives each of a second, third, fourth, fifth, sixth, seventh, and eighth seed value, processor 102 respectively sets the state value stored in register 112 to a '3,' (408) '5,' (412) '7,' (416) '9,' (420) '11,' (424) '13,' (428) and '15' (432). And when processor 102 conveys each of a second, third, fourth, fifth, sixth, seventh, and eighth verification set output value and secondary expected value address, as well as a state value, processor 102 respectively sets the state value in register 112 to a '4,' (410) '6,' (414) '8,' (418) '10,' (422) '12,' (426) '14,' (430) and '16' (434).

In sum, by conveying a seed value address 108 and an expected result address 110 over address bus 131, conveying a seed value 118 and a verification set output value 107 over data bus 132, and comparing the verification set output value 107 to an expected result 120, control module 100 is able to determine whether processor 102, control bus 130, address bus 131, and data bus 132 are collectively functioning correctly. By properly selecting the values corresponding to the multiple seed value addresses 108, multiple expected result addresses 110, multiple seed values 118, and multiple expected results 122 (and correspondingly, multiple verification set output values 107), proper operation of each line of address bus 131 and control bus 132 may be individually verified. Improper operation of control module 100 and processor 102 is further detected by comparing the length of time required by control module 100 to perform the control module's control functions, or by processor 102 to perform the processor's signal processing functions, to a predetermined time period measured by counter 124.

Control module 100 performs the verifications process without requiring a redundant execution of each step of the verification process in each of multiple signal processing units. As a result, software changes implemented in one signal processing unit do not necessitate implementation of the same changes in the other signal processing unit.

While the present invention has been particularly shown and described with reference to particular embodiments thereof, it will be understood by those skilled in the art that various changes may be made and equivalents substituted for elements thereof without departing from the spirit and scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. A method for verifying the integrity of operation of a control module having a digital signal processing unit, the method comprising steps of:

conveying a seed value to the digital signal processing unit;

incrementing a stored state value;

executing, by the digital signal processing unit, a set of verification instructions based on the seed value to produce a verification set output value;

receiving, from the digital signal processing unit, the verification set output value;

further incrementing the stored state value to produce a twice incremented second state value;

comparing the verification set output value to an expected result to produce a comparison; and determining whether an error has occurred based on the comparison.

2. The method of claim 1, further comprising steps of:

receiving, from the digital signal processing unit and via an address bus, a seed value address corresponding to a storage location of the seed value; and determining the seed value based on the received seed value address.

3. The method of claim 1, further comprising a step of receiving, from the digital signal processing unit and via an address bus, a expected result address corresponding to a storage location of the expected result, and wherein the step of determining whether an error has occurred comprises a step of determining whether an error has occurred based on the comparison and on the received expected result address.

4. The method of claim 3, further comprising a step of retrieving the expected result based upon the received expected result address.

5. The method of claim 1, further comprising a step of retrieving the expected result based upon a stored state value.

6. The method of claim 1, further comprising a step of determining that an error has occurred when a predetermined amount of time expires after conveying the seed value to the digital signal processing unit and prior to receiving the verification set output value from the digital signal processing unit.

7. The method of claim 1, wherein the stored state value comprises a first state value, wherein the digital signal processing unit stores a second state value, and wherein the method further comprising steps of:

incrementing, by the digital signal processing unit, the second state value upon receiving the seed value;

conveying, by the digital signal processing unit, the verification set output value;

further incrementing, by the digital signal processing unit, the second state value upon conveying the verification set output value to produce a twice incremented second state value.

8. A method for verifying the integrity of operation of a control module having a first digital signal processing unit coupled to second digital signal processing unit, wherein the first digital signal processing unit stores a set of verification instructions, wherein the first digital signal processing unit stores a plurality of seed value addresses and the second digital signal processing unit stores a plurality of seed values and a plurality of expected results, the method comprising steps of:

(a) conveying, by the second digital signal processing unit to the first digital signal processing unit, a seed value of the plurality of seed values, wherein this step includes the substeps of:

conveying, by the first digital signal processing unit to the second digital signal processing unit, a seed value address of the plurality of seed value addresses, receiving, by the second digital signal processing unit, the seed value address, retrieving, by the second digital signal processing unit, a seed value, and conveying, by the second digital signal processing unit, the retrieved seed value;

(b) executing, by the first digital signal processing unit, the set of verification instructions based on the seed value to produce a verification set output value;

(c) conveying, by the first digital signal processing unit to the second digital signal processing unit, the verification set output value;

(d) comparing, by the second digital signal processing unit, the verification set output value to a corresponding expected result of the plurality of expected results to produce a comparison;

(e) determining whether an error has occurred based on one or more of the comparison of the received verification set output value to a corresponding expected result and the received seed value address;

(f) determining whether a predetermined number of iterations of steps (b) through (e) have been completed; and (g) when fewer than the predetermined number of iterations have been completed, conveying a succeeding seed value of the plurality of seed values to the first digital signal processing unit and repeating steps (b) through (f).

9. The method of claim 8, wherein the seed value is retrieved based on a state value stored in the second digital signal processing unit.

10. The method of claim 8, wherein the seed value is retrieved based on the received seed value address.

11. The method of claim 8, further comprising a step of:

(h) determining that an error has occurred when a predetermined amount of time expires after conveying the seed value to the first digital signal processing unit and prior to receiving the verification set output value from the first digital signal processing unit; and wherein step (g) comprises a step of, when fewer than the predetermined number of iterations have been completed, conveying a succeeding seed value of the plurality of seed values to the digital signal processing unit and repeating steps (b) through (f) and (h).

12. The method of claim 8, wherein the processor further stores a plurality of expected result addresses, wherein each expected result address of the plurality of expected result addresses corresponds to an expected result of the plurality of expected results, and wherein the method further comprises a step of:

(h) conveying, by the first digital signal processing unit to the second digital signal processing unit, an expected result address of the plurality of expected result addresses; and wherein step (e) comprises a step of determining an error based on one or more of the comparison of the received verification set output value to the corresponding expected result and the received expected result address, wherein step (f) comprises a step of determining whether a predetermined number of iterations of steps (b) through (e) and (h) have been completed, and wherein step (g) comprises steps of, when fewer than the predetermined number of iterations have been completed, conveying, by the second digital signal processing unit, a succeeding seed value of the plurality of seed values to the first digital signal processing unit, conveying, by the first digital signal processing unit, a succeeding expected result address of the plurality of secondary expected result addresses, and repeating steps (b) through (g) and (h).

13. The method of claim 12, wherein the first digital signal processing unit further stores a first state value, wherein the second digital signal processing unit farther stores a second state value, and wherein the method farther comprises steps of:

(i) incrementing, by the second digital signal processing unit, the second state value upon conveying the seed value to the digital signal processing unit; and (j) farther incrementing, by the second digital signal processing unit, the second state value upon receiving the verification set output value to produce a twice incremented second state value;

(k) incrementing, by the first digital signal processing unit, the first state value upon receiving the seed value;

(l) further incrementing, by the first digital signal processing unit, the first state value upon conveying the verification set output value to produce a twice incremented first state value; and wherein step (e) comprises a step of determining an error based on the comparison of the received verification set output value to the corresponding expected result and the received expected result address, wherein step (f) comprises a step of determining whether a predetermined number of iterations of steps (b) through (e) and (i) through (l) have been completed, and wherein step (g) comprises steps of, when fewer than the predetermined number of iterations have been completed, conveying, by the second digital signal processing unit, a succeeding seed value of the plurality of seed values to the first digital signal processing unit, conveying, by the first digital signal processing unit, a succeeding expected result address of the plurality of expected result addresses, and repeating steps (b) through (f) and (i) through (l).

14. A control module that self-verifies the integrity of the control module's operations, the control module comprising:

a first digital signal processing unit that receives a seed value from a second digital signal processing unit, executes a set of verification instructions based on the seed value to produce a verification set output value, and conveys the verification set output value to the second digital signal processing unit; and a second digital signal processing unit coupled to the first digital signal processing unit that stores the seed value and an expected result, retrieves the seed value based on a received seed value address received from the first digital signal processing unit, conveys the seed value to the first digital signal processing unit, receives the verification set output value from the first digital signal processing unit, compares the received verification set output value to the expected result to produce a comparison, and determines whether an error has occurred based on the comparison.

15. The control module of claim 14, further comprising a data bus coupling the first digital signal processing unit to the second digital signal processing unit, wherein the second digital signal processing unit conveys the seed value to the first digital signal processing unit via the data bus and the first digital signal processing unit conveys the verification set output value to the second digital signal processing unit via the data bus.

16. The control module of claim 14, further comprising an address bus coupling the first digital signal processing unit to the second digital signal processing unit, wherein the first digital signal processing unit further stores a seed value address corresponding to a location of the seed value in the second digital signal processing unit and conveys the seed value address to the second digital signal processing unit via the address bus, wherein the second digital signal processing unit conveys the seed value to the digital signal processing unit in response to receiving the seed value address, and wherein the second digital signal processing unit determines whether an error has occurred based on the received seed value address.

17. The control module of claim 14, further comprising an address bus coupling the first digital signal processing unit to the second digital signal processing unit, wherein the first digital signal processing unit further stores a expected result address corresponding to a location of the expected result in the second digital signal processing unit, wherein the first digital signal processing unit conveys the expected result address to the second digital signal processing unit over the address bus, and wherein the integrated circuit determines whether an error has occurred based on the comparison or the received expected result address.

18. The control module of claim 14, wherein the first digital signal processing unit conveys a counter value to the second digital signal processing unit, wherein the second digital signal processing unit further comprises a counter that counts down based on the counter value, and wherein the second digital signal processing unit further determines that an error has occurred when the counter counts down to zero prior to the second digital signal processing unit receiving the verification set output value from the first digital signal processing unit.

19. The control module of claim 14, wherein the first digital signal processing unit stores a first state value and the second digital signal processing unit stores a second state value, wherein each of the first state value and the second state value correspond to a state of the verification process, wherein the second digital signal processing unit retrieves the seed value based upon the second state value.

20. The control module of claim 19, further comprising a data bus and an address bus that each couple the first digital signal processing unit to second digital signal processing unit, wherein the first digital signal processing unit further stores a seed value address corresponding to a location of the seed value in the second digital signal processing unit and conveys the seed value address to the second digital signal processing unit via the address bus, wherein the second digital signal processing unit conveys the seed value via the data bus to the first digital signal processing unit in response to receiving the seed value address and increments the second state value upon conveying the seed value, wherein the first digital signal processing unit increments the first state value upon receiving the seed value, wherein the first digital signal processing unit further increments the first stare value upon conveying the verification set output value to the second digital signal processing unit to produce a twice incremented first state value, and wherein the second digital signal processing unit further increments the second state value upon receiving the verification set output value from the first digital signal processing unit to produce a twice incremented second state value.

* * * * *